United States Patent
Cho et al.

(10) Patent No.: US 8,856,678 B1
(45) Date of Patent: Oct. 7, 2014

(54) USING TOUCH INPUT TO SELECT, SHRINK, AND FOLD DISPLAYED CONTENT

(71) Applicant: LG Electronics Inc., Seoul (KR)

(72) Inventors: Eunhyung Cho, Seoul (KR); Sinae Chun, Seoul (KR); Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/910,627

(22) Filed: Jun. 5, 2013

(30) Foreign Application Priority Data

May 14, 2013 (KR) .......................... 10-2013-0054401

(51) Int. Cl.
*G06F 3/048* (2013.01)
*G06F 3/0485* (2013.01)

(52) U.S. Cl.
CPC .................................... *G06F 3/0485* (2013.01)
USPC ............................ 715/784; 715/863; 345/682

(58) Field of Classification Search
None
See application file for complete search history.

(56) References Cited

U.S. PATENT DOCUMENTS

| | | |
|---|---|---|
| 2002/0118230 A1 | 8/2002 | Card et al. |
| 2007/0168875 A1 | 7/2007 | Kowitz et al. |
| 2008/0082938 A1* | 4/2008 | Buczek ......................... 715/784 |
| 2008/0168404 A1* | 7/2008 | Ording .......................... 715/863 |
| 2008/0270886 A1* | 10/2008 | Gossweiler et al. ........... 715/227 |
| 2009/0259975 A1 | 10/2009 | Asai |
| 2012/0054684 A1 | 3/2012 | Gossweiler, III et al. |
| 2012/0144342 A1 | 6/2012 | Yu et al. |
| 2013/0050269 A1* | 2/2013 | Arrasvuori .................... 345/661 |
| 2013/0346914 A1* | 12/2013 | Jeong ............................ 715/784 |

* cited by examiner

*Primary Examiner* — Stephen Hong
*Assistant Examiner* — Asher Kells
(74) *Attorney, Agent, or Firm* — Birch, Stewart, Kolasch & Birch, LLP

(57) ABSTRACT

A display device and a method of controlling therefor according to one embodiment relate, if a display area of the display device does not have an enough space to display a whole content, to the display device providing only a content area which a user wants to see and providing an easy-to-use scrolling environment to the user by folding a part of the whole content and the method of controlling therefor.

28 Claims, 14 Drawing Sheets

(a)  (b)  (c)

(a)  (b)

FIG. 4
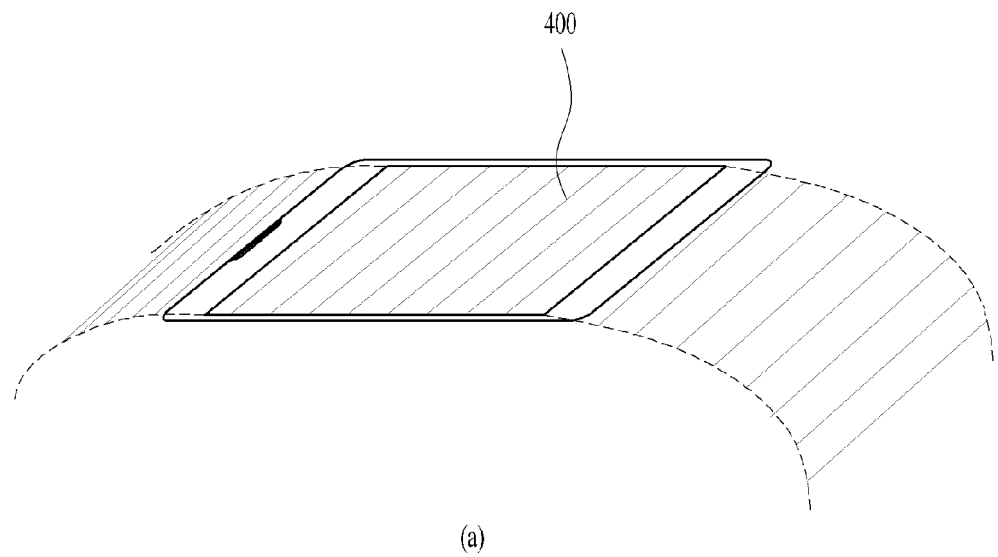
(a)
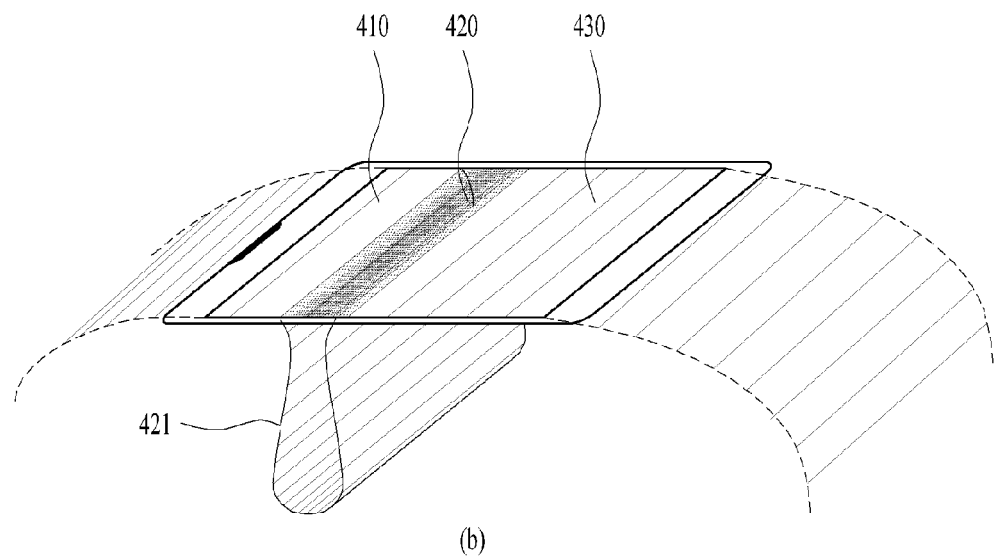
(b)

(a)  (b)

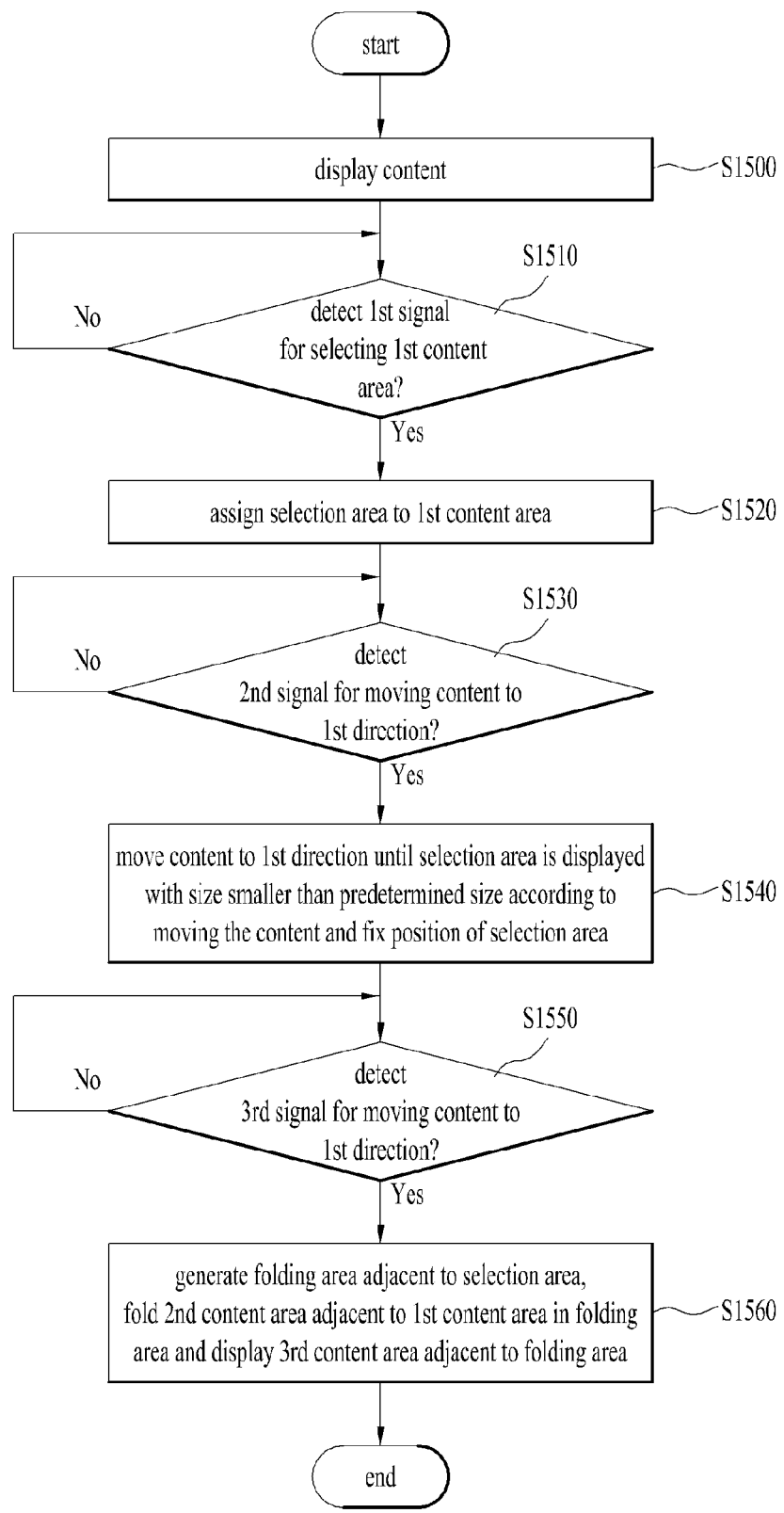

USING TOUCH INPUT TO SELECT, SHRINK, AND FOLD DISPLAYED CONTENT

This application claims the benefit of the Korean Patent Application No. 10-2013-0054401, filed on May 14, 2013, which is hereby incorporated by reference as if fully set forth herein.

BACKGROUND OF THE INVENTION

1. Field of the Invention

The present specification relates to a display device and a method of controlling therefor, and more particularly, if a display area of the display device does not have an enough space to display a whole content, to a display device providing only a content area which a user wants to see and providing an easy-to-use scrolling environment to the user by folding a part of the whole content and a method of controlling therefor.

2. Discussion of the Related Art

A display device may be able to display such content as a text or a graphic in a display area. Yet, there may exist contents requiring the display area wider than a screen of the display device.

Hence, in case that the display device displays the contents requiring the display area wider than the screen of the display device, the display device makes a user see the whole content by providing a scroll function.

In this case, a size of a scroll bar decreases as the content increases. Thus, a user feels inconvenience as the content increases because the user has to scroll more. In particular, in case of an online shopping, the user has to scroll again in order to see a product already passed by and it is hard for the user to remember where the exact location of the product was.

SUMMARY OF THE INVENTION

Accordingly, the present specification is directed to an apparatus and method thereof that substantially obviate one or more problems due to limitations and disadvantages of the related art.

An object of the present specification is to provide a display device folding a part of the whole content and a method of controlling therefor in case that a display area of a display device does not have an enough space to display a whole content.

Another object of the present specification is to provide a display device providing a content region of which a user wants to see in a manner of collecting the content region only and a method of controlling therefor in case that a display area of a display device does not have an enough space to display a whole content.

A further different object of the present specification is to provide a display device providing an easy-to-use scrolling environment and a method of controlling therefor in case that a display area of a display device does not have an enough space to display a whole content.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital device according to one embodiment includes a display unit configured to display a content containing a first content area, a second content area adjacent to the first content area, and a third content area adjacent to the second content area, a sensor unit configured to sense a user input and configured to deliver a signal according to a sensed result to a processor, and the processor configured to control the display unit and the sensor unit. In this case, the processor is further configured to assign a first selection area to the first content area, if a first signal for selecting the first content area is detected, move the content to a first direction until the first selection area is displayed with a size smaller than a predetermined size according to moving the content, if a second signal for moving the content to the first direction is detected, fix a position of the first selection area, generate a folding area adjacent to the first selection area and fold the second content area in the folding area, if a third signal for moving the content to the first direction is detected, and display the third content area adjacent to the folding area.

A method of controlling a digital device according to one embodiment includes the steps of displaying a content containing a first content area, a second content area adjacent to the first content area, and a third content area adjacent to the second content area, assigning a selection area to the first content area, if a first signal for selecting the first content area is detected, moving the content to a first direction until the selection area is displayed with a size smaller than a predetermined size according to moving the content, if a second signal for moving the content to the first direction is detected, fixing a position of the selection area, generating a folding area adjacent to the selection area and folding the second content area in the folding area, if a third signal for moving the content to the first direction is detected, and displaying the third content area adjacent to the folding area.

According to one embodiment, a display device may be able to provide an environment capable of folding a part of a whole content. By doing so, a user may be able to fold an unattractive region or an unnecessary region among the whole content. In particular, the display device according to one embodiment may be able to provide a user interface capable of editing the content to the user.

According to a different embodiment, a display device enables a user to see a region of interest only in a manner of collecting the region by folding a part of a whole content.

According to a further different embodiment, a display device may be able to insert an unnecessary part into a folding area by folding a part of a whole content. By doing so, the display device reduces a length of the content to be scrolled and may be then able to provide an easy-to-use scrolling environment to a user.

More specific effects of the invention shall be described in detail in the following description It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a conceptual diagram of a folding area;

FIG. 15 is a flowchart for a method of controlling a display device according to one embodiment.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present specification. Wherever possible, the same reference numbers will be used throughout the drawings to refer to the same or similar parts.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, while the embodiments have been concretely described with reference to the attached diagrams and the contents written on the diagrams, the present specification may be non-restricted or non-limited to the embodiments.

Meanwhile, a digital device described in the present specification may be able to include such a digital device of a various form capable of displaying an image as a PC, a PDA (Personal Digital Assistant), a notebook, a tablet PC, a smart phone, and the like. And, the digital device may include a touch screen in the present specification.

Figure 1:
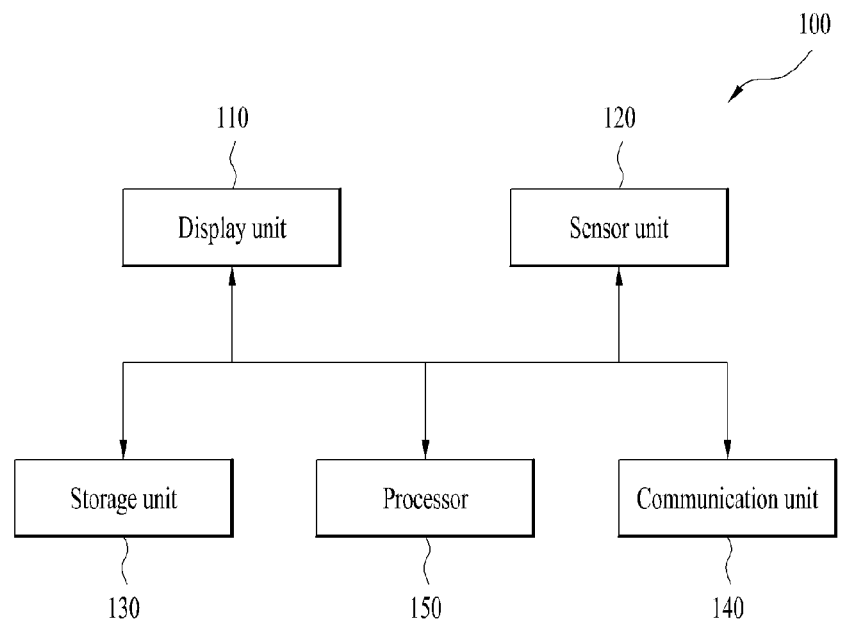
FIG. 1 is a functional block diagram of a digital device according to one embodiment.

FIG. 1 is a functional block diagram of a digital device according to one embodiment. Yet, FIG. 1 is just one embodiment. A part of a configuration module can be deleted or a new configuration module can be added according to a necessity of a person engaged in the corresponding field.

As shown in FIG. 1, a digital device 100 according to one embodiment may include a display unit 110, a sensor unit 120, a storage unit 130, a communication unit 140, and a processor 150.

The display unit 110 may be able to output an image data in a display screen. And, the display unit 110 may be able to output an image based on a content implemented by the processor 150, an application, or a control command of the processor 150.

The sensor unit 120 configured to sense a surrounding environment of a digital device 100 using at least one sensor installed in the digital device 100 and may be then able to deliver a sensed result to the processor 150 in a signal form. And, the sensor unit 120 senses a user input and may be then able to deliver a signal according to a sensed result to the processor 150. In this case, the processor 150 may be able to detect a signal generated by the user input, such as the signal delivered from a touch sensor, among the many received signals.

Hence, the sensor unit 120 may be able to include at least one sensing means. As one embodiment, the at least one sensing means may include such a sensing means as a gravity sensor, a terrestrial magnetism sensor, a motion sensor, a gyro sensor, an acceleration sensor, an infrared sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a grip sensor, and the like.

And, the sensor unit 120 is a common name for the various aforementioned sensing means. The sensor unit senses various inputs of a user and the environment of the digital device 100 and may be then able to deliver the sensed result to the processor 150 in order for the processor to perform an operation according to the sensed result. The aforementioned sensors may be included in the digital device 100 as a separate element or may be included in the digital device in a manner of being combined as at least one element.

And, in case that the aforementioned display unit 110 include a touch sensitive display, the digital device 100 may be able to sense such a user input as a touch input by the display unit 120.

Hence, the processor 150 recognizes a signal according to the user input delivered from at least one selected from the group consisting of the sensor unit 120 and the display unit 110 and may be able to control the digital device 100 according to the signal.

In other word, the processor 150 may be able to detect the signal delivered via at least one selected from the group consisting of the sensor unit 120 and the display unit 110 among the signals delivered from a configuration unit. In particular, the processor 150 may be able to detect the signal generated by a user input, which is received from a specific sensor, among the signals received by the processor. For instance, if the sensor unit 120 senses the user input, the processor 150 may be able to detect the signal corresponding to the user input using a sensed result.

In the following description, if each step or operation performed by the display device starts or progresses by a user input, assume that a process of generating a signal according to the user input is included in the explanation on the aforementioned process although it is not duplicately explained.

And, it may be able to express that the processor controls the display device or the configuration unit included in the display device according to the user input and the processor and the display device can be explained in a manner of equating.

The storage unit 130 may be able to store such a various digital data as an audio, a picture, a video, an application, and the like. The storage unit 130 indicates such a various digital data storing space as a flash memory, a random access memory (RAM), a solid state drive (SSD), and the like.

And, the storage unit 130 may be able to temporarily store a data received from an external device via the communication unit 140. In this case, the storage unit 130 can be used for a buffering to output the data received from the external device in the display device 100. And, the storage unit 130 may be able to store the content displayed in the display device 100. In this case, the storage unit 130 can be selectively installed in the display device 100.

The communication unit 140 may be able to transceive data with an external device by performing a communication using various protocols. And, the communication unit 140 accesses an external network in wired or wireless and may be then able to transceive such a digital data as content, an application, and the like.

Besides, although it is not depicted in FIG. 1, the display device can be equipped with an audio input/output unit or a power unit.

The audio output unit (not depicted) includes such an audio output means as a speaker, earphones, and the like. And, the audio output unit may be able to output an audio based on the content implemented in the processor 150 or a control command of the processor 150. In this case, the audio output unit can be selectively installed in the display device 100.

The power unit (not depicted) is a power source connected to a battery inside of the device or an external power supply and may be able to supply power to the display device 100.

And, the display device 100 depicted in FIG. 1 is a block diagram according to one embodiment. Blocks represented in a manner of being separated indicate the logically distinguished elements of the device. Hence, the elements of the aforementioned device can be equipped with a single chip or a plurality of chips according to the design of the device.

Figure 2:
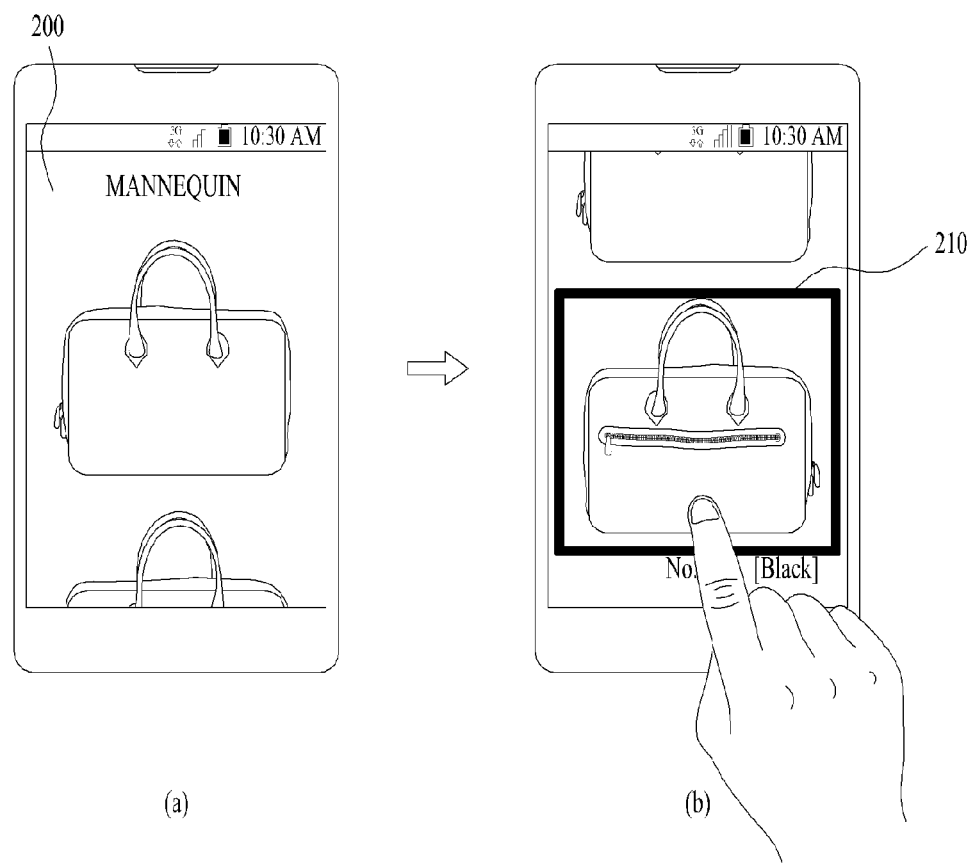
FIG. 2 is a diagram of one embodiment generating a first selection area.

FIG. 2 is a diagram of one embodiment generating a first selection area. FIG. 2 (*a*) is a diagram of one embodiment displaying a content in the display device and FIG. 2 (*b*) is a diagram of one embodiment generated the first selection area in the content.

As shown in FIG. 2 (*a*), it is often that the content 200 displayed in the display device cannot be displayed in a screen of the display device at one time. Hence, a user may be able to see a rest of the content by performing a scrolling. Yet, in case of the content having an enormous amount of content and having a clear division between an area of interest and the area of non-interest of the user per area, such as the content 200 related to a shopping, the user may feel inconvenience when the user tries to see the area of interest only by the scrolling.

Hence, as shown in FIG. 2 (*b*), the display device according to one embodiment may be able to assign a first selection area 210 to a first content area according to a first signal of a user. Hence, the display device may be able to provide a user interface enabling the user to easily see the first selection area 210. This shall be described in detail with reference to FIG. 7 to FIG. 8.

As mentioned in the foregoing description, having detected the first signal selecting the first content area in the displayed content 200, the display device may be able to select the first content area as the first selection area 210.

The first signal may occur by a touch of the user for a specific area of the content and a form of the touch may be non-limited to a specific form. For instance, the display device may be able to configure a signal occurred by a long press touch of the user for a specific area of the content as the first signal or may be able to configure a signal occurred by a short touch in a right hand side or a short touch in a left hand side of a user as the first signal. In this case, the touch means a hovering operation staying with a certain distance from a display unit by a touching means as well as an actual touch of the touching means including a hand of a user to the display unit.

And, in order for the user to know the first selection area 210, the display device according to one embodiment may be able to provide an indicator indicating the first selection area 210. The indicator may be able to include a mark image corresponding to the first selection area 210. And, in order for the user to know the first selection area 210, the indicator can be provided in a form of having a graphic effect.

Meanwhile, the display device according to one embodiment provides a folding area as well as the first selection area to enable the user to easily see only an area of interest among the content. In particular, the display device configures the area of interest of the user as a selection area and folds an area of non-interest in the folding area. By doing so, the display device may be able to provide a user interface making the user easily see only the area of interest.

Figure 3:
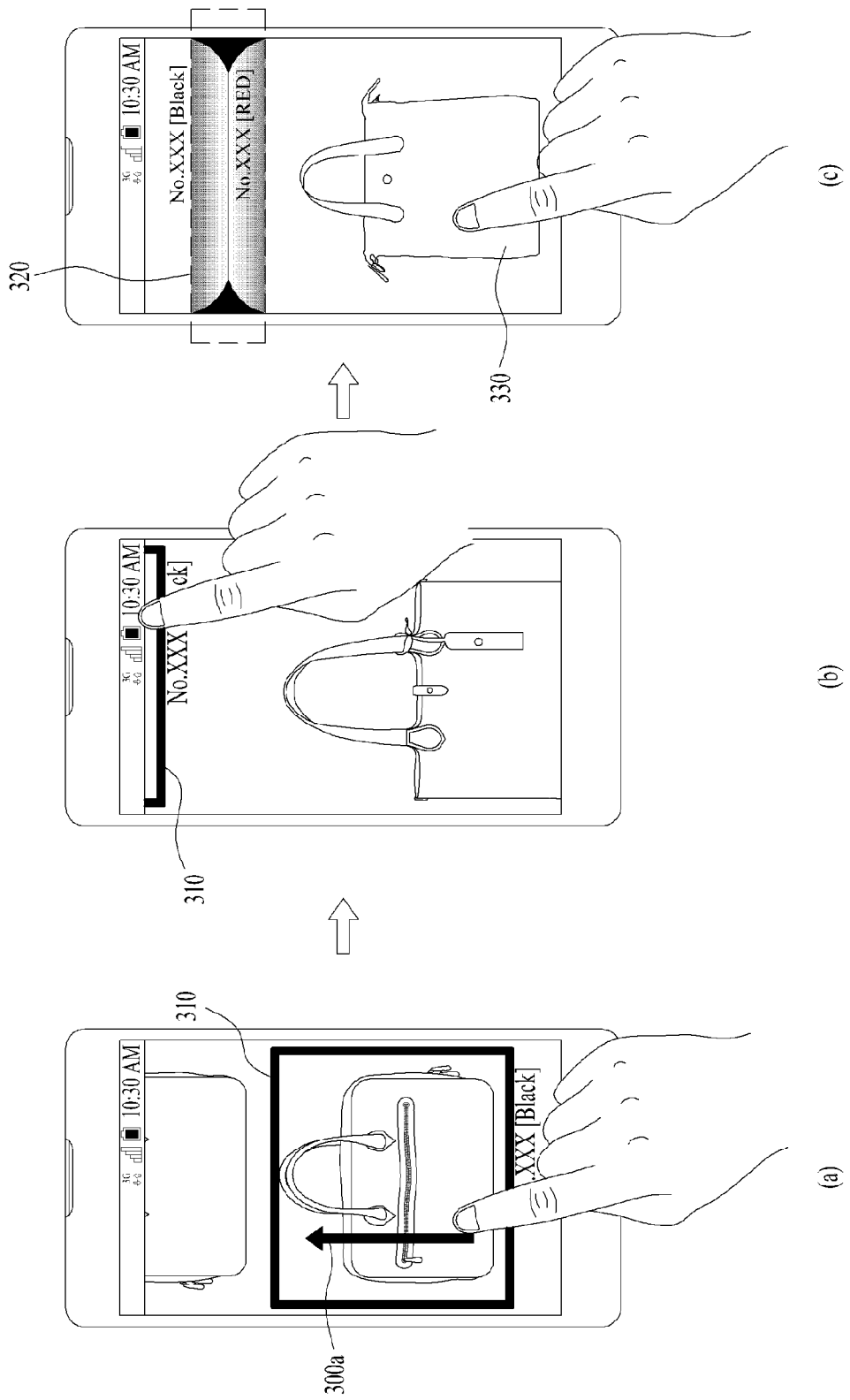
FIG. 3 is a diagram of one embodiment generating a folding area.

FIG. 3 is a diagram of one embodiment generating a folding area.

As shown in FIG. 3 (*a*), if the display device detects a first signal selecting a first content area, the display device according to one embodiment may be able to assign a first selection area 310 to the first content area. This is identical to the description described in FIG. 2.

Having detected a second signal moving in a first direction 300*a*, the display device according to one embodiment may be able to move content to the first direction 300*a*. In this case, the second signal can be generated by a touch of a user for a specific area of the content and a form of the touch may be non-limited to a specific form. For instance, the display device may be able to configure a signal generated by an operation of touching and dragging of a user for a display unit of the display device as the second signal. In particular, the second signal can be generated by the operation of scrolling the content by the hand of the user.

As shown in FIG. 3 (*b*), in case that the first selection area 310 is displayed with a size smaller than a predetermined size in a process of moving the content in the first direction, the display device may be able to fix a position of the first selection area 310.

As mentioned in the above description, by fixing the position of the first selection area 310, the display device may be able to enable a user to easily see the first selection area 310 again at any time. And, the display device may be able to display together a content area except the first content area in the display area by displaying only a part of the first selection area 310 in the display area.

In this case, if the user intends to continuously move the content in the first direction 300*a*, it is not able to move the content any more due to the fixed first selection area 310. Hence, if a third signal, which moves the content in the first direction 300*a*, is detected after the position of the first selection area 310 is fixed, the display device may be able to generate a folding area 320 in a manner of being adjacent to the first selection area 310. And, the display device may be able to fold a second content area adjacent to the first content area in the folding area 320.

Hence, if a user is not interested in the content of the second content area, the user may be able to fold the second content area in the folding area 320 until an area of interest is displayed. And, the display device may be able to display a third content area 330 adjacent to the second content area, which is folded in the folding area 320, in a manner of being adjacent to the folding area 320.

And, the third signal can be generated by a touch of a user for a specific area of the content and a form of the touch may be non-limited to a specific form. For instance, the third signal may occur by an identical touch of the user generating the second signal.

While the second signal is a signal occurred by a touch operation of a user for scrolling before the position of the first selection area 310 is fixed, the third signal may be the signal occurred by the operation of the user for scrolling after the position of the first selection area 310 is fixed. In the following description, the second signal and the third signal are explained in detail.

Before explaining on the second signal and the third signal, the content displayed in the display area of the display device may include a first content area, a second content area adjacent to the first content area, and a third content area adjacent to the second content area. In this case, the first content area, the second content area, and the third content area can be displayed all together in the display area of the display device. Or, the first content area and the second content area are displayed in the display area only and the third content area may be displayed in the display area after a folding area is generated.

The first content area can be assigned as the first selection area according to a user input. If the display device detects the second signal, which moves content to a first direction, the display device moves the content in the first direction until the first selection area is displayed with a size smaller than a predetermined size according to moving the content. The display device may be able to fix the position of the first selection area.

In this case, the second signal can be generated by a first touch of a user, which starts from the first content area and then moves in the first direction. In particular, after the user configures the first content area as the first selection area by touching the first content area, the display device recognizes a signal generated by a continuous operation of dragging in the first direction as the second signal and may be then able to move the content in the first direction.

On the other hand, the second signal can be generated by a second touch of the user, which starts from a second content area and then moves in the first direction. In particular, the display device may be able to assign the first selection area to the first content area according to the first touch of the user. Since then, the display device recognizes a signal generated by the new second touch for the second content area scrolled in the first direction as the second signal and may be then able to move the content in the first direction according to the second signal.

And, in case that the second signal corresponds to the signal generated by the second touch of the user, which starts from the second content area and then moves in the first direction, the second signal and the third signal may be identical to each other. In case that a signal is generated by a touch operation of a user, which starts from the second content area and then moves in the first direction, the display device fixes the position of the first selection area in a manner of moving the content in the first direction, generates a folding area in a manner of being adjacent to the first selection area, and may be able to fold the second content area in the folding area.

In other word, according to the touch operation of the user, which starts from the second content area and then moves in the first direction, the display device may be able to simultaneously perform a series of operations including a fixing the position of the first selection area, a generating the folding area, and folding the second content area in the folding area. In particular, the display device may be able to recognize the second signal and the third signal as one signal without separately distinguishing the second signal from the third signal.

And, although the signal is generated by the identical touch operation of the user, the display device may be able to recognize the signal generated by the touch of the user before the position of the first selection area is fixed as the second signal and the signal generated by the touch of the user after the position of the first selection area is fixed as the third signal.

Hence, if the display device detects the third signal, which moves the content in the first direction, after the position of the first selection area is fixed, the display device generates a folding area in a manner of being adjacent to the first selection area and may be able to fold the second content area in the folding area. In this case, the third signal can be generated by a fourth touch of the user, which starts from the third content area and then moves in the first direction.

Meanwhile, FIG. 4 is a conceptual diagram of a folding area. The folding area corresponds to an area in which a user is able to fold an area of non-interest among the contents. Hence, as shown in FIG. 4 (*a*), in case that there exists a considerable amount of content 400 to be displayed in the display device, the display device may be able to provide an environment capable of saving only the area of which a user wants in a manner of generating the folding area.

As shown in FIG. 4 (*b*), the display device generates the folding area 420 in a manner of being adjacent to the first selection area 410, which is fixed, and may be then able to fold the second content area 421 in the folding area 420. And, the display device may be able to display a third content area 430 adjacent to the second content area 421 in a manner of being adjacent to the folding area 420.

Hence, if the display device detects a signal moving in the first direction for the third content area 430, the display device folds the third content area 430 in the folding area 420 and may be able to display a fourth content area adjacent to the third content area 430 in a manner of being adjacent to the folding area 420.

As mentioned in the foregoing description, the content area, which is foldable in the folding area 420, does not have a limit in size. And, the rest of content area adjacent to the content corresponding to the first selection area can be folded all together in the folding area 420.

Figure 5:
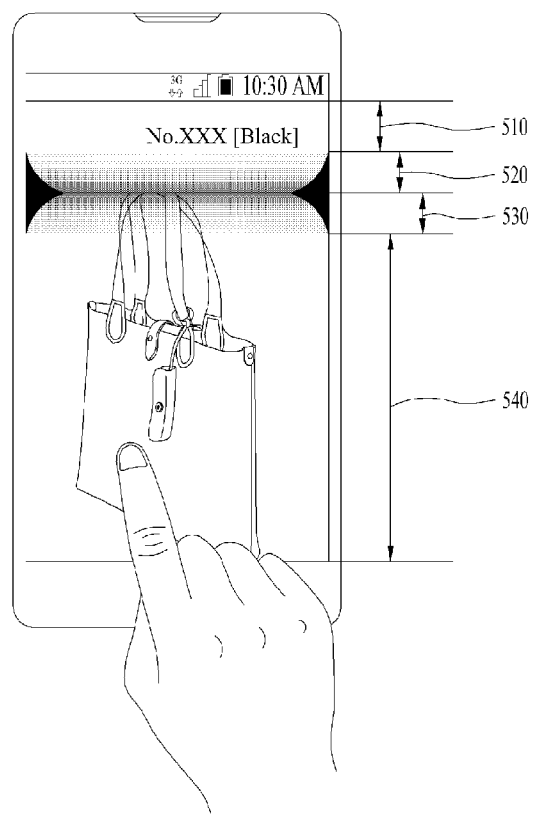
FIG. 5 is a diagram of one embodiment of a user interface according to a generation of a folding area.

FIG. 5 is a diagram of one embodiment of a user interface according to a generation of a folding area.

As shown in FIG. 5, a user interface according to a generation of a folding area may include a first selection area 510, a first folding area 520, a second folding area 530, and a third content area 540.

The first selection area 510 is an area corresponding to the first content area and the position of the first selection area is fixed. The first folding area 520 and the second folding area 530 form a folding area and the second content area adjacent to the first content area can be folded in the folding area. And, the third content area 540 may correspond to the content area adjacent to the folded second content area.

Meanwhile, the display device according to one embodiment may be able to generate a plurality of selection areas and a plurality of folding areas. This shall be explained with reference to FIG. 6.

Figure 6:
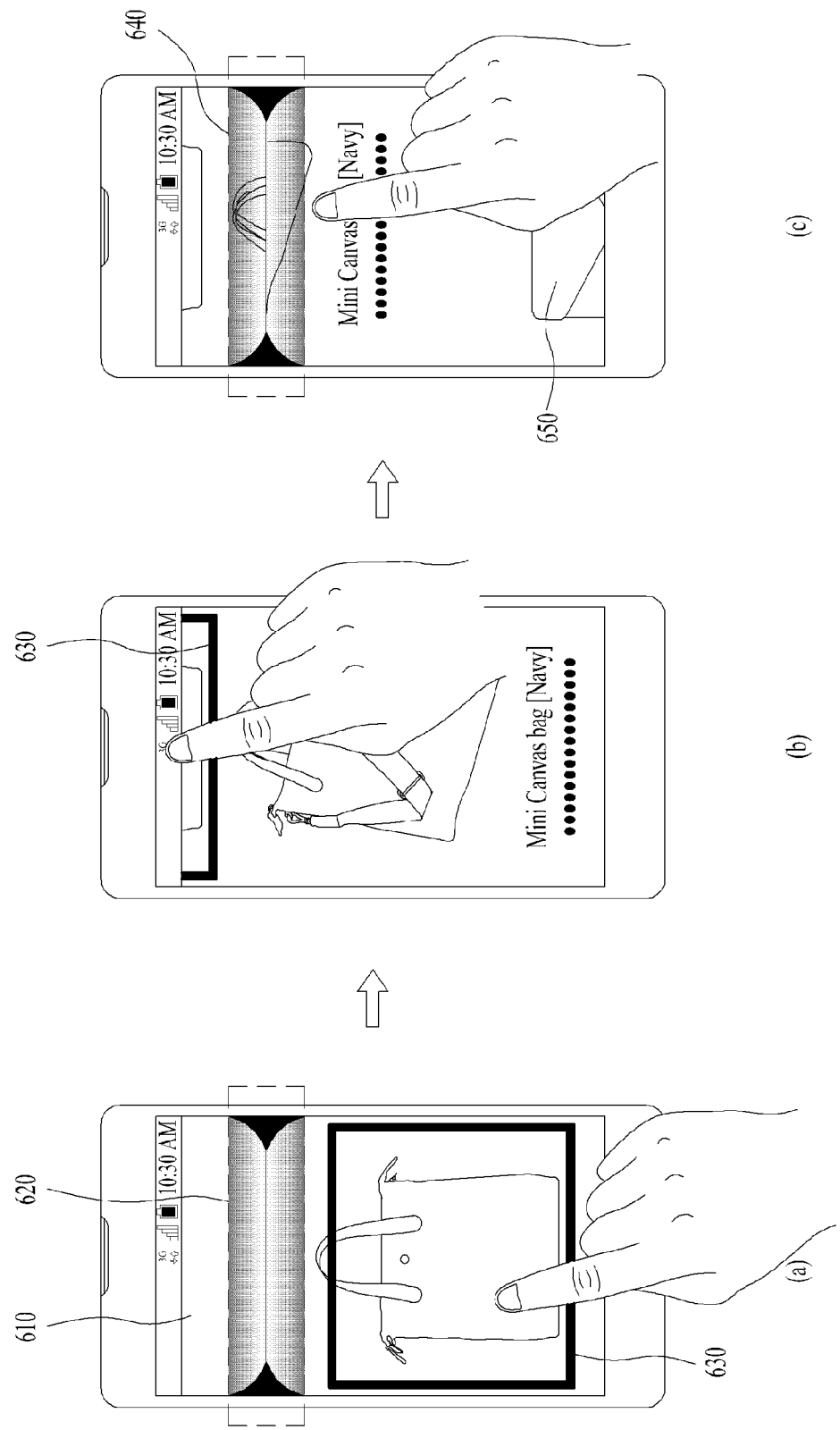
FIG. 6 is a diagram of one embodiment generating a second selection area.

FIG. 6 is a diagram of one embodiment generating a second selection area.

As shown in FIG. 6 (*a*), if a first selection area 610 is assigned and a folding area 620 is generated, the display device may be able to display a third content area in a manner of being adjacent to the folding area 620.

If an eighth signal, which selects the third content area, is detected, the display device may be able to assign a second selection area 630 to the third content area. The eighth signal can be generated by an identical touch operation of a user, which generates the first signal selecting the first content area to configure the first selection area 610. In particular, the display device may be able to configure an inputting operation of the user with an identical operation to configure a selection area in a manner of including the first selection area 610 and the second selection area 630.

If a ninth signal, which moves the second selection area 630, is detected, the display device may be able to cancel a fixed position of the first selection area 610. Hence, if a tenth signal, which moves the content in the first direction, is detected, the display device may be able to move the content in the first direction. In this case, since the fixed position of the first selection area 610 corresponds to a state of being cancelled, the display device may be able to move the first selection area 610 as well in the first direction.

The ninth signal and tenth signal are the signals generated by such a continuous touch operation of a user as a drag operation for a display unit. Hence, the tenth signal may correspond to the signal consecutively generated after the ninth signal or may correspond to the identical signal to the ninth signal.

As shown in FIG. 6 (*b*), if the second selection area 630 is displayed with a size smaller than a predetermined size due to the move, the display device may be able to fix a position of the second selection area 630.

In this case, if the user intends to continuously move the content in the first direction, the display device cannot move the content anymore due to the fixed second selection area 630. Hence, if an additional signal, which moves the content in the first direction, is detected after the position of the second selection area 630 is fixed, the display device may be able to generate a folding area 640. And, the display device may be able to fold a fourth content area adjacent to the third content area in the folding area 640.

Hence, if a user is not interested in the content of the fourth content area, the user may be able to fold the fourth content area in the folding area 640 until an area of interest is displayed. And, the display device may be able to display a fifth content area adjacent to the fourth content area in a manner of being adjacent to the folding area 640.

As mentioned in the foregoing description, the display device may be able to assign a plurality of selection areas and a plurality of folding areas. Hence, a user configures the area of interest among the content as a selection area irrespective of the number of the selection area and may be able to fold an area of non-interest in the folding area. Hence, if a touch is performed for the selection area to move the content, the user may be able to sequentially see a plurality of the selection areas according to a scrolling. In particular, the user may be able to see only the area of interest in a manner of collecting. This shall be explained in detail with reference to FIG. 7.

Figure 7:
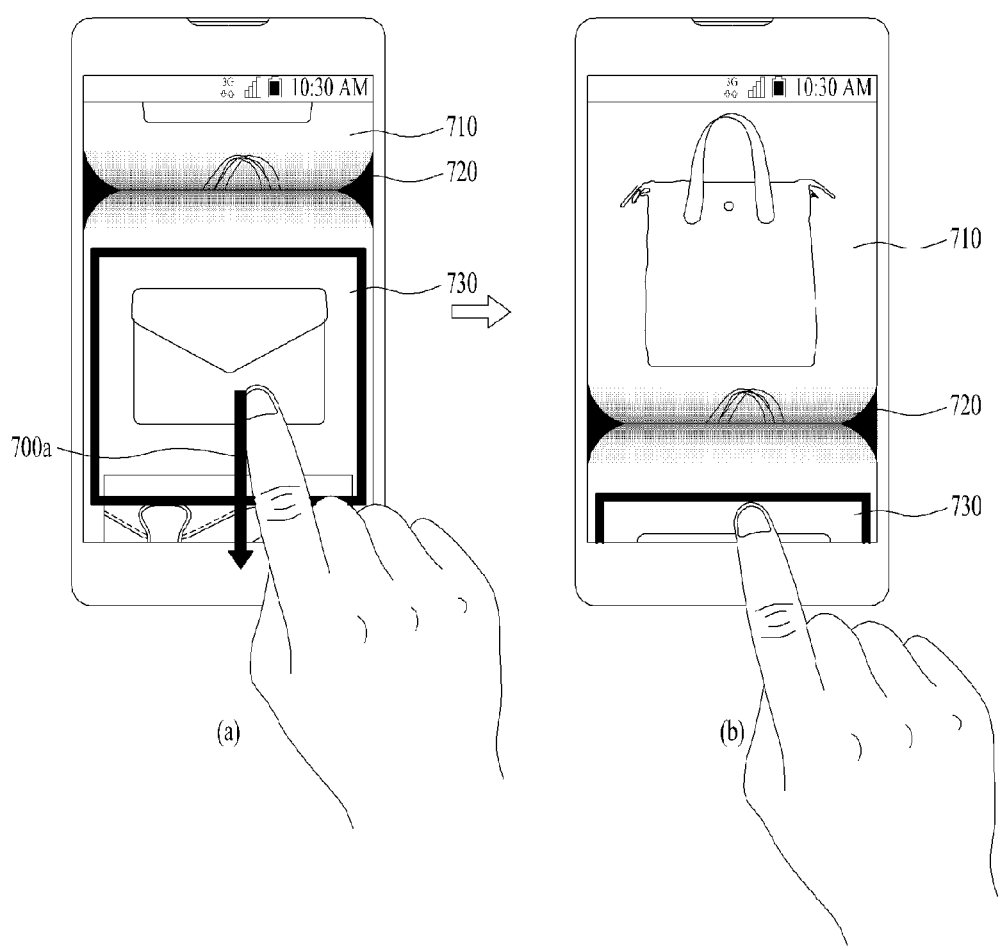
FIG. 7 is a diagram of one embodiment moving a content according to a touch of a user for a second selection area.

First of all, FIG. 7 is a diagram of one embodiment moving a content according to a touch of a user for a second selection area.

As shown in FIG. 7 (*a*), the display device may be able to detect a signal, which moves a second selection area 730 in a second direction 700*a*. As shown in FIG. 7 (*b*), the display device may be able to move a first selection area 710, a folding area 720, and the second selection area in the second direction 700*a* according to the signal, which moves in the second direction 700*a*.

In particular, if the signal moving in the second direction for the second selection area 730 is detected, the display device may be able to move a whole content in the second direction 700*a*. In this case, the display device may be able to move the content in the second direction 700*a* while the areas configured as the selection area and the folding area are maintained as it is.

Hence, a user performs a touch moving in the second direction 700*a* or in the first direction, which is an opposite direction of the second direction, and may be then able to easily see the content areas configured as the selection areas.

In FIG. 7, one embodiment for a case that the signal moving the content for the second selection area is detected is explained. In the following description, one embodiment for a case that a display device determines at least one area among a content to be moved according to the area of the content where a fourth signal, which moves the content, is detected is explained.

In this case, the fourth signal can be generated by a touch of a user for a specific area and a form of the touch may be non-limited to a specific form. The embodiment for the case that the display device determines at least one area of the content to be moved according to the area of the content where the signal is detected is explained in detail with reference to FIG. 8 to FIG. 9.

Figure 8:
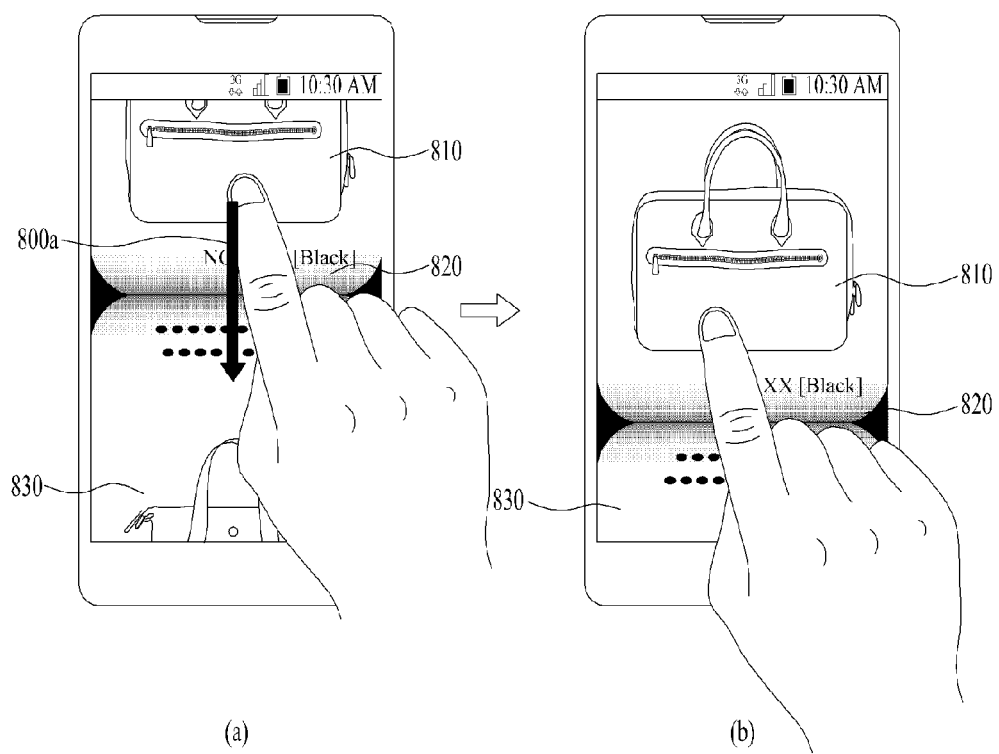
FIG. 8 is a diagram of one embodiment moving a content according to a touch of a user for a first selection area.

FIG. 8 is a diagram of one embodiment moving a content according to a touch of a user for a first selection area.

As shown in FIG. 8 (*a*), the display device may be able to detect a signal moving in a second direction 800*a* for a first selection area 810. As shown in FIG. 8 (*b*), having detected the signal moving in the second direction 800*a*, the display device may be able to move the first selection area 810, a folding area 820, and a third content area 830 all together in the second direction 800*a*. In particular, the display device may be able to move the content in the second direction 800*a* while the areas configured as the first selection area 810 and the folding area 820 are maintained as it is.

And, the display device may also be able to identically operate for a user touch moving in the first direction, which corresponds to an opposite direction of the second direction 800*a*. In other word, if a fifth signal, which moves in the first direction for the first selection area 810, is detected, the display device may be able to move the first selection area 810, the folding area 820, and the third content area 830 in the first direction.

Hence, a user performs a touch moving in the second direction 800*a* or in the first direction, which corresponds to an opposite direction of the second direction, for the first selection area 810 and may be then able to easily see different selection areas besides the first selection area 810.

If a sixth signal, which moves in the first direction for the folding area, is detected, the display device may be able to display the content corresponding to the folding area in the first selection area. Having detected the sixth signal, the display device may be able to fix the folding area and the third content area.

Figure 9:
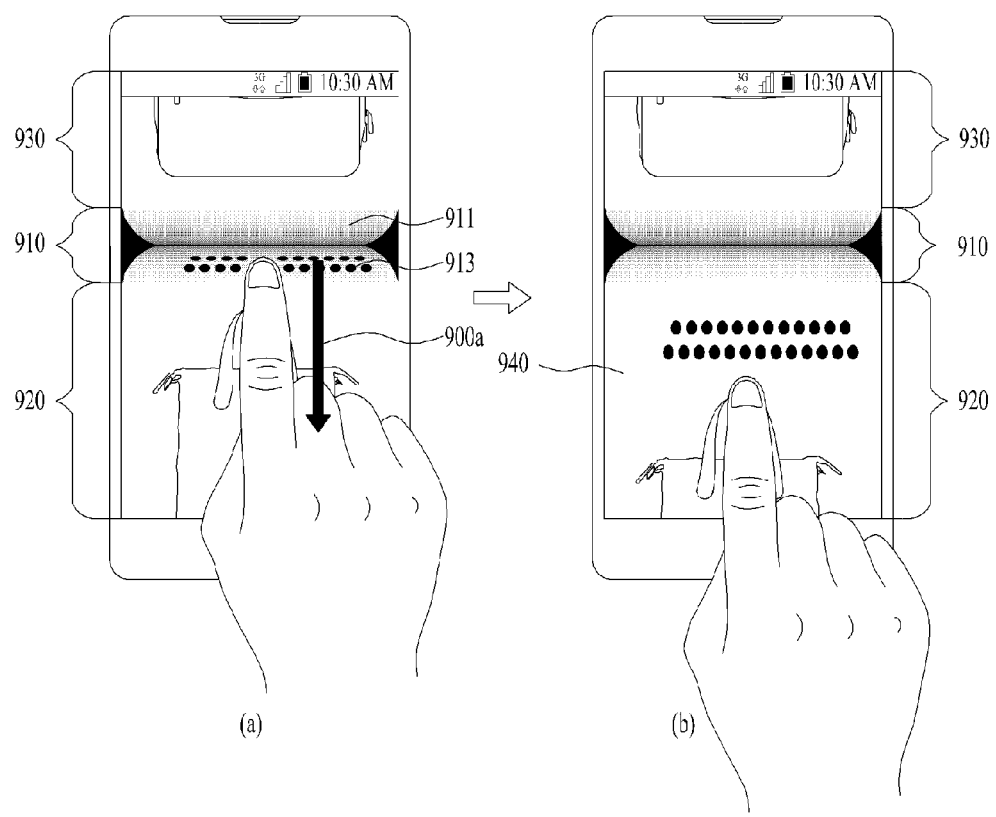
FIG. 9 is a diagram of a first embodiment moving a content according to a touch of a user for a folding area.

FIG. 9 is a diagram of a first embodiment moving a content according to a touch of a user for a folding area.

As shown in FIG. 9 (a), the display device may be able to detect a seventh signal, which moves in a second direction 900a for a folding area 910. As shown in FIG. 9 (b), if the seventh signal, which moves in the second direction 900a, is detected, the display device may be able to display the content 940 corresponding to the folding area 910 in the third content area 920.

On the other hand, if a sixth signal, which moves in a first direction corresponding to an opposite direction of the second direction, is detected, the display device may be able to display the content 940 corresponding to the folding area 910 in the first selection area 930.

As mentioned in the foregoing description, the display device may be able to display the content 940 corresponding to the folding area 910 in the first selection area 930 or the third content area 920 according to the direction of the user touch, which started in the folding area 910. In this case, the display device may be able to display the content included in the folding area 910 in a manner of corresponding to the size of the first selection area 930 or the third content area 920. Hence, in case that content is left in the folding area 910, the display device maintains the folding area 910. In case that there is no content left in the folding area, the display device may be able to delete the folding area 910.

Meanwhile, the folding area 910 may be able to include a first folding area 911 adjacent to the first selection area 930 and a second folding area 913 adjacent to the third content area 920. In this case, a second embodiment different from the aforementioned first embodiment is explained with reference to FIG. 9. In particular, the second embodiment corresponds to an embodiment that the display device moves content according to a touch of a user for the folding area.

According to the second embodiment, if a twelfth signal moving in the first direction for the first folding area 911 is detected, the display device may be able to display the content corresponding to the first folding area in the first selection area 930. In this case, having detected the twelfth signal, the display device may be able to fix the second folding area 913 and the third content area 920.

On the other hand, if a thirteenth signal moving in the second direction 900a for the second folding area 913 is detected, the display device may be able to display the content corresponding to the second folding area 913 in the third content area 920. In this case, having detected the thirteenth signal, the display device may be able to fix the first selection area 930 and the first folding area 911.

As mentioned in the foregoing description, the display device according to the second embodiment may be able to provide an environment capable of performing a more exquisite scroll to a user compared to the display device according to the first embodiment, since the display device according to the second embodiment may be able to perform a different operation according to a touch per area in a manner of dividing the folding area 910 into the first folding area 911 and the second folding area 913.

In other word, the display device according to the first embodiment may be able to determine an area in which the content corresponding to the folding area is to be displayed according to a touch direction of a user, which has started from the folding area 910. On the other hand, the display device according to the second embodiment may be able to determine an area in which the content is to be displayed in the first selection area 930 or the third content area 920 according to whether the area of which the touch of the user has started corresponds to the first folding area 911 or the second folding area 913.

Hence, the display device according to the second embodiment may be able to provide an environment capable of easily checking the content situating in the folding area by a scrolling operation to a user.

Meanwhile, if an eleventh signal, which is configured to cancel at least one of the first selection area and the second selection area, is detected, the display device according to the first embodiment may be able to cancel at least one of the first selection area and the second selection area. The eleventh signal can be generated by a fifth touch and a sixth touch for at least two areas among the first selection area, the second selection area and the folding area.

Figure 10:
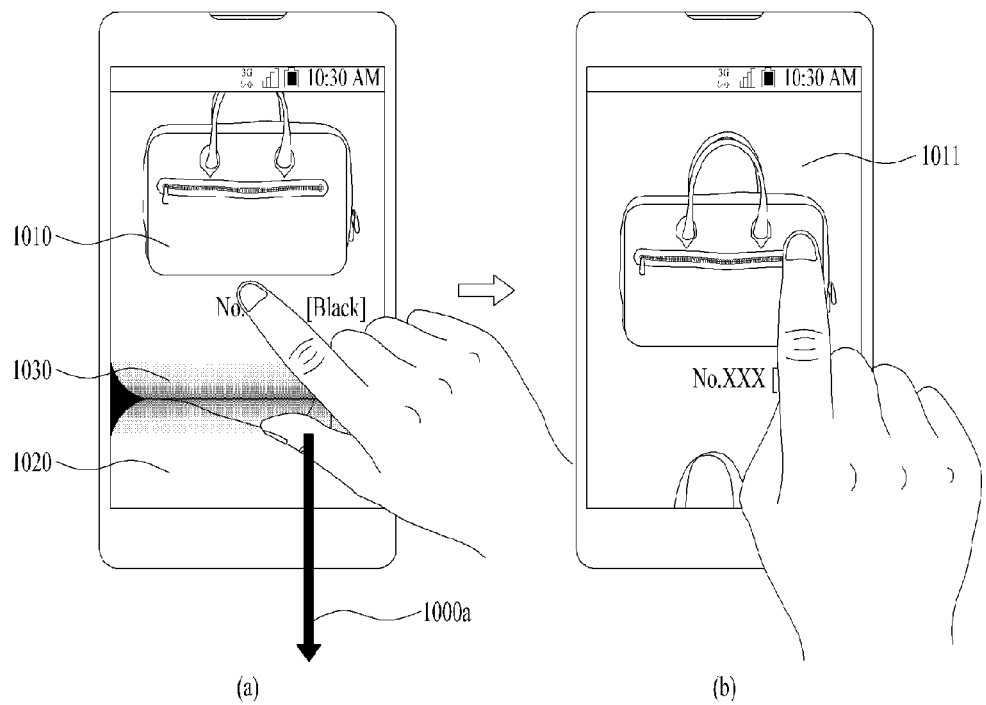
FIG. 10 is a diagram of one embodiment canceling a second selection area.

FIG. 10 is a diagram of one embodiment canceling a second selection area.

As shown in FIG. 10 (a), in case that a user fixes a fifth touch in a first selection area 1010 and performs a sixth touch moving in a second direction 1000a in a folding area 1030, the display device may be able to cancel a second selection area 1020.

As mentioned in the foregoing description, having canceled the second selection area 1020, the display device may be able to delete a folding area 1030 as shown in FIG. 10 (b). As the display device has canceled the second selection area 1020 and has deleted the folding area 1030, the display device may be able to display the content 1011 corresponding to the first selection area 1010 in a display area of the display device.

Unlike the description mentioned in FIG. 10, in case that the user fixes the fifth touch in the first selection area 1010 and performs the sixth touch moving in the second direction 1000a in a second selection area 1020, the display device may be able to cancel the second selection area 1020.

Figure 11:
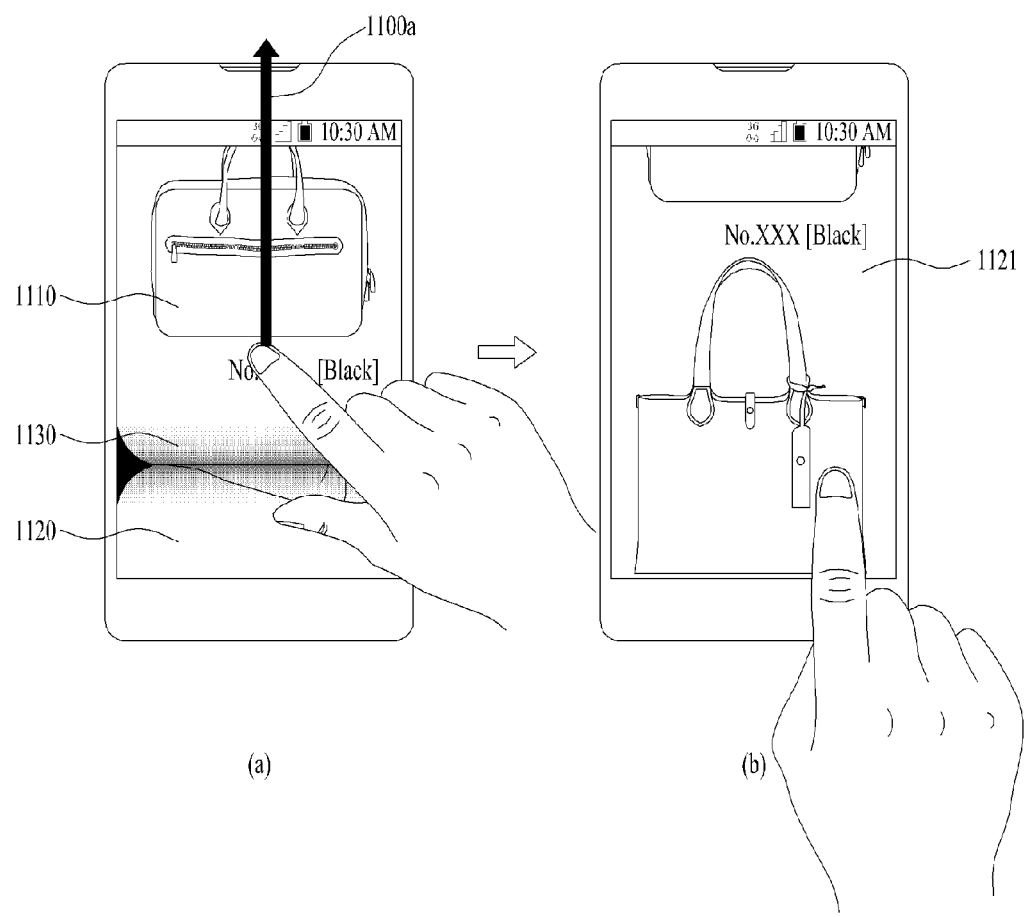
FIG. 11 is a diagram of one embodiment canceling a first selection area.

FIG. 11 is a diagram of one embodiment canceling a first selection area.

As shown in FIG. 11 (a), in case that a user performs a fifth touch moving in a first direction 1100a in a first selection area 1110 and fixes a sixth touch in a folding area 1130, the display device may be able to cancel the first selection area 1110.

As mentioned earlier, having canceled the first selection area 1110, the display device may be able to delete a folding area 1130 as shown in FIG. 11 (b). And, as the display device has canceled the first selection area 1110 and has deleted the folding area 1130, the display device may be able to display the content 1121 corresponding to a second selection area 1120.

Yet, instead of the second selection area 1120, a third content area can be displayed in a manner of being adjacent to the folding area 1130. In this case, the display device may be able to display the content corresponding to the third content area in the display area.

And, as the display device has canceled the first selection area 1110 and has deleted the folding area 1130, the display device may be able to display the content, which was folded in the folding area 1130, in the display area of the display device.

Meanwhile, unlike the description mentioned in FIG. 11, in case that a user performs a fifth touch moving in a first direction 1100a in the first selection area 1110 and fixes a sixth touch in the second selection area 1120, the display device may be able to cancel the first selection area 1120.

Figure 12:
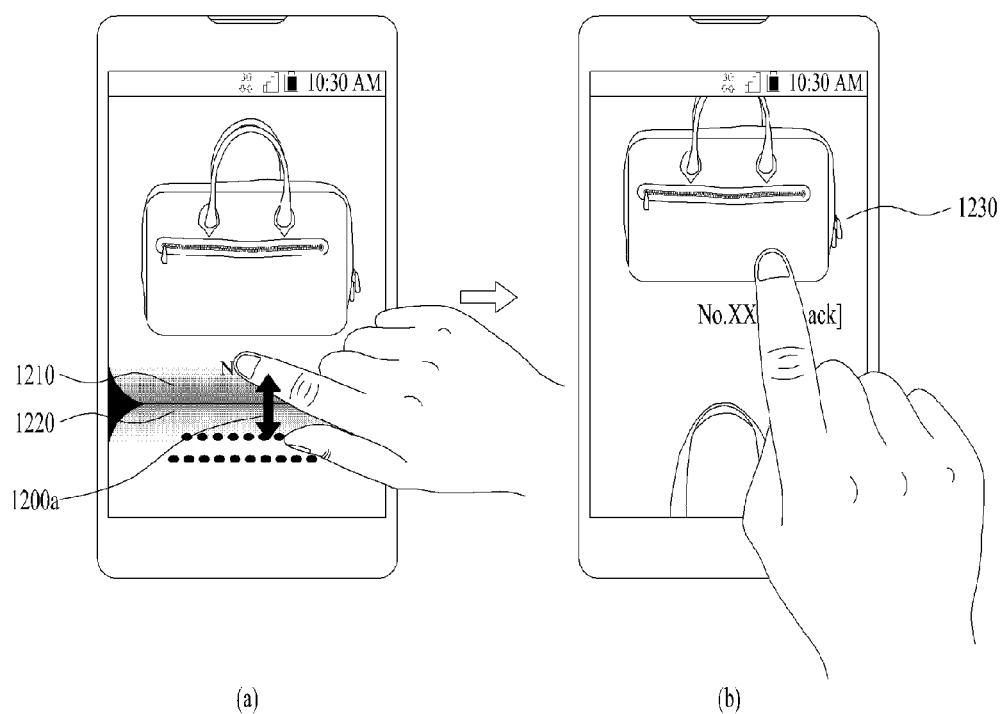
FIG. 12 is a diagram of one embodiment deleting a folding area.

FIG. 12 is a diagram of one embodiment deleting a folding area.

As shown in FIG. 12 (a), in a state that a user has performed a fifth touch in a first folding area and a sixth touch in a second folding area 1220, if the user moves a touch means in such a direction 1200a putting some distance between the fifth touch and the sixth touch as a zoom-out or a pinch-out, the display device may be able to delete the folding area 1210/1220.

As mentioned earlier, having deleted the folding area 1210/1220, the display device may be able to display the content corresponding to the folding area 1210/1220 in the display area.

And, the display device may be able to cancel at least one of the selection areas adjacent to the folding area 1210/1220 to be deleted. Hence, the display device may be able to cancel at least one of the first selection area and the second selection area.

Figure 13:
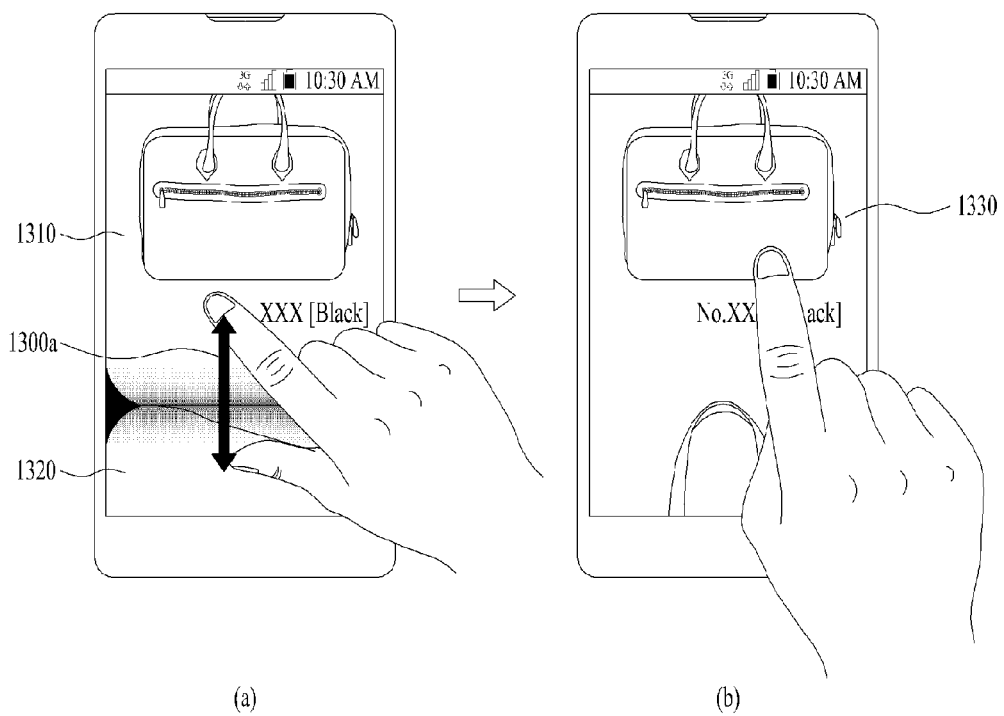
FIG. 13 is a diagram of one embodiment canceling a first selection area and a second selection area.

FIG. 13 is a diagram of one embodiment canceling a first selection area and a second selection area.

As shown in FIG. 13 (a), a user may be able to perform a fifth touch moving in a first direction for a first selection area 1310 and a sixth touch moving in a second direction for a second selection area 1320. In particular, the user may be able to drag a touch means in a display area in such a direction 1300a putting some distance between the fifth touch and the sixth touch as a zoom-out or a pinch-out.

As shown in FIG. 13 (b), the display device may be able to cancel the first selection area 1310 and the second selection area 1320 in response to the fifth touch and the sixth touch. And, the display device may be able to display the content 1330 corresponding to the first selection area 1310 and the content corresponding to the second selection area 1320 in the display area.

As mentioned in FIG. 10 to FIG. 13, the display device may be able to detect a touch of a user for two areas to cancel a selection area. In this case, assume that the selection area includes the first selection area and the second selection area and the two areas, which detect the touch of the user, correspond to the two of the first selection area, the second selection area, and the folding area.

In this case, as mentioned in FIG. 10 to FIG. 11, if a touch for one area among the touch of the user for two areas corresponds to a touch moving with directivity, the display device may be able to cancel either the first selection area or the second selection area only.

On the other hand, as shown in FIG. 12 to FIG. 13, if the touch for the two areas among the touch of the user for the two areas corresponds to the touch moving with directivity, the display device may be able to cancel both the first selection area and the second selection area.

Figure 14:
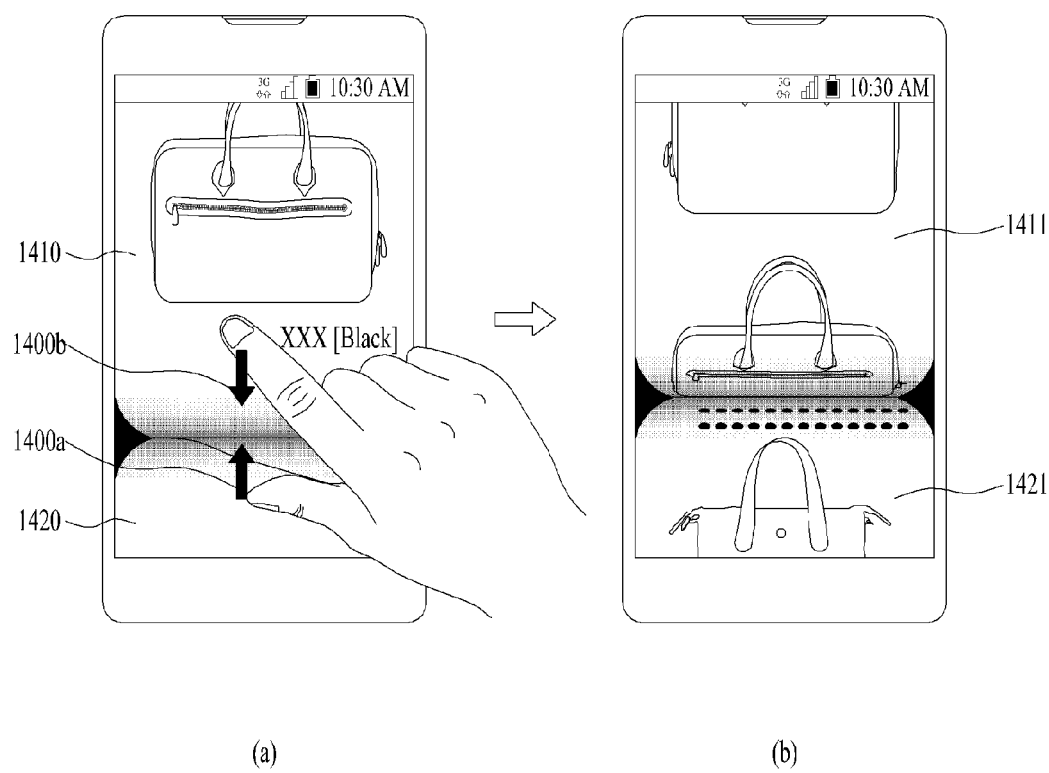
FIG. 14 is a diagram of one embodiment moving a content according to a touch of a user for a first selection area and a second selection area.

Meanwhile, FIG. 14 is a diagram of one embodiment moving a content according to a touch of a user for a first selection area and a second selection area. FIG. 14 corresponds to one embodiment for a case that a touch direction of a user is different from the touch direction aforementioned in FIG. 12 to FIG. 13.

As shown in FIG. 14 (a), a user may be able to perform a fifth touch moving in a second direction 1400b in the first selection area 1410 and a sixth touch moving in a first direction 1400a in the second selection area 1420.

As shown in FIG. 14 (b), the display device may be able to move content 1411 corresponding to the first selection area 1410 in the second direction and may be able to fold a content area adjacent to a folding area in the first selection area 1410 in the folding area. And, the display device may be able to move content 1421 corresponding to the second selection area 1420 in the first direction 1400a and may be able to fold the content area adjacent to the folding area in the second selection area 1420 in the folding area.

In this case, the display device may be able to maintain the content areas configured as the first selection area 1410 and the second selection area 1420 as it is without canceling the content areas. By doing so, the user may be able to easily compare a part of the content included in the first selection area 1410 with a part of the content included in the second selection area 1420.

Meanwhile, in an expansion mode, which displays content in a manner of expanding, the display device according to one embodiment may be able to deactivate an operation corresponding to the aforementioned touch and the signal.

In general, if a touch of a user in a form of a zoom-out or a pinch-out is detected, the display device may be able to expand a displayed content. Hence, in order for the display device to distinguish the operation to expand the content from the previously mentioned operation of the user, the display device may be able to deactivate a series of operations corresponding to the touch and the signal in the expansion mode.

FIG. 15 is a flowchart for a method of controlling a display device according to one embodiment.

First of all, the display device according to one embodiment may be able to display content [S1500]. The content may include a first content area, a second content area adjacent to the first content area, and a third content area adjacent to the second content area. And, the first, the second, and the third content area can be simultaneously displayed in a display area of the display device. Or, at least one area among the first, the second, and the third content area can be displayed in the display area only.

As mentioned in FIG. 2, the display device may be able to detect a first signal selecting the first content area [S1510]. The first signal can be generated by a long press touch of a user, which selects the first content area, and may be non-limited to a specific form.

As mentioned in FIG. 2 to FIG. 3, having detected the first signal, the display device may be able to configure the first content area as a selection area [S1520]. A user configures an area of interest among the content as the selection area and may be then able to see only the area of interest in a manner of collecting.

As mentioned in FIG. 3, the display device may be able to detect a second signal moving content in a first direction [S1530]. The second signal can be generated by a first touch of a user, which starts in the first content area and then moves in the first direction. Or, the second signal can be generated by a second touch of the user, which starts in a second content area and then moves in the first direction.

As mentioned in FIG. 3, having detected the second signal, the display device moves the content to the first direction until a selection area is displayed with a size smaller than a predetermined size according to moving the content. The display device may be able to fix a position of the selection area [S1540]. As mentioned earlier, by fixing the position of the selection area, the display device may be able to provide a user interface enabling the user to see the content corresponding to the selection area whenever the user wants.

As mentioned in FIG. 3, the display device may be able to detect a third signal moving the content in the first direction [S1550]. The third signal can be generated by a fourth touch of a user, which starts in a third content area and then moves in the first direction.

Yet, in case that the second signal is generated by the second touch, which starts in the second content area and then moves in the first direction, the second signal and the third signal may be identical to each other. In particular, the second signal and the third signal correspond to the signals generated by such a continuous touch of a user moving content, as a scrolling. While the second signal may correspond to a signal generated by a touch of a user before a position of a selection area is fixed, the third signal may correspond to the signal generated by the touch of the user after the position of the selection area is fixed.

As mentioned in FIG. 3 to FIG. 4, having detected the third signal, the display device generates a folding area in a manner of being adjacent to the selection area and may be able to fold a second content area in the folding area [S1560]. And, the display device may be able to display a third content area adjacent to the second content area in a manner of being adjacent to the folding area [S1560].

Hence, the user may be able to leave an area of interest only in a manner of folding an area of non-interest among the content in the folding area.

Moreover, for clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A display device according to one embodiment and a controlling method therefor may not limitedly apply to the composition and method of the aforementioned embodiments. The aforementioned embodiments may be configured in a manner of being selectively combined the whole of the embodiments or a part of the embodiments to achieve various modifications.

Meanwhile, a method of controlling a display device can be implemented with a code readable by a processor in a recording media readable by the processor. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. And, implementing in a form of a carrier wave such as a transmission via an internet and the like is also included. The recording media readable by the processor are distributed to the computer systems connected by a network and codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on the both of the inventions can be complementally applied, if necessary It will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents.

What is claimed is:

1. A display device, comprising:
a display unit configured to display a content containing a first content area, a second content area adjacent to the first content area, and a third content area adjacent to the second content area;
a sensor unit configured to sense a touch input and configured to deliver a signal according to a sensed result to a processor; and
the processor configured to control the display unit and the sensor unit,
wherein the processor is further configured to:
detect a first touch input for selecting the first content area;
assign a first selection area to the first content area corresponding to the first touch input;
detect a second touch input for moving the first selection area and the second content area to a first direction;
move the first selection area and the second content area to the first direction corresponding to the second touch input, wherein the first selection area is scrolled over and a displayed size of the first selection area is shrunk according to the second touch input;
fix a position and a size of the first selection area when the first selection area is displayed with a size equal to a predetermined size by moving the first selection area, wherein the predetermined size is a minimum size with which the first selection area is displayed;
detect a third touch input for moving the content to the first direction, wherein the third touch input is detected on any portion of the second content area; and
generate a folding area adjacent to the fixed first selection area, fold the entire second content area on which the third touch input is detected into the folding area, and display the third content area adjacent to the folding area having the entire second content area folded therein according to the third touch input,
wherein third touch input is detected sequentially to the second touch input, and a direction associated with the second touch input and the third touch input is the same.

2. The display device of claim 1, wherein the second touch input is generated by a first touch of a user, which starts in the first content area and moves to the first direction.

3. The display device of claim 1, wherein the second touch input is generated by a second touch of a user, which starts in the second content area and moves to the first direction.

4. The display device of claim 1, wherein the second touch input and the third touch input are a same touch input.

5. The display device of claim 3, wherein the third touch input is continuous to the second touch input which is generated by the second touch of the user until the position of the first selection area is fixed, and wherein the third touch input is generated by a third touch continuous to the second touch after the position of the first selection area is fixed.

6. The display device of claim 1, wherein the third touch input is generated by a fourth touch of a user, which starts in the second content area and moves to the first direction.

7. The display device of claim 1, wherein the processor determines at least one area of the content to be moved according to a specific area of the content on which a fourth touch input for moving the content is detected.

8. The display device of claim 1, wherein if a fifth touch input for moving the first selection area to the first direction is detected, the processor moves the first selection area, the folding area, and the third content area to the first direction.

9. The display device of claim 1, wherein if a sixth touch input for moving the folding area to the first direction is detected, the processor displays the second content area in the first selection area.

10. The display device of claim 9, wherein if the sixth touch input is detected, the processor fixes positions of the folding area and the third content area.

11. The display device of claim 1, wherein if a seventh touch input for moving the folding area to a second direction is detected, the processor displays the second content area in the third content area.

12. The display device of claim 11, wherein if the seventh touch input is detected, the processor fixes positions of the first selection area and the folding area.

13. The display device of claim 1, wherein if an eighth touch input for selecting the third content area is detected, the processor assigns a second selection area to the third content area.

14. The display device of claim 13, wherein if a ninth touch input for moving the second selection area is detected, the processor cancels a fixed position of the first selection area.

15. The display device of claim 13, wherein if a tenth touch input for moving the content to the first direction is detected, the processor moves the content to the first direction until the second selection area is displayed with a size smaller than a predetermined size according to moving the content and the processor fixes a position of the second selection area.

16. The display device of claim 1, wherein if an eleventh touch input for cancelling at least one of the first selection area and a second selection area is detected, the processor cancels at least one of the first selection area and the second selection area.

17. The display device of claim 16, wherein the eleventh touch input is generated by a fifth touch and a sixth touch of a user for two areas among the first selection area, the second selection area, and the folding area.

18. The display device of claim 17, wherein if the fifth touch is fixed and the sixth touch moves to a second direction, the processor cancels the second selection area.

19. The display device of claim 17, wherein if the fifth touch moves to the first direction and the sixth touch is fixed, the processor cancels the first selection area.

20. The display device of claim 17, wherein if the fifth touch moves to the first direction and the sixth touch moves to a second direction, the processor cancels the first selection area and the second selection area.

21. The display device of claim 16, wherein if at least one of the first selection area and the second selection area is cancelled according to the eleventh touch input, the processor deletes the folding area.

22. The display device of claim 1, wherein the folding area includes a first folding area adjacent to the first selection area and a second folding area adjacent to the third content area.

23. The display device of claim 22, wherein if a twelfth touch input for moving the first folding area to the first direction is detected, the processor displays the second content area in the first selection area.

24. The display device of claim 23, wherein if the twelfth touch input is detected, the processor fixes the second folding area and the third content area.

25. The display device of claim 22, wherein if a thirteenth touch input for moving the second folding area to a second direction is detected, the processor displays the second content area in the third content area.

26. The display device of claim 25, wherein if the thirteenth touch input is detected, the processor fixes the first selection area and the first folding area.

27. The display device of claim 1, wherein the processor deactivates an operation corresponding to at least one touch input selected from the group consisting of the first touch input, the second touch input, and the third touch input in an expansion mode in which the display device displays the content to be expanded.

28. A method of controlling a display device, comprising:
    displaying a content containing a first content area, a second content area adjacent to the first content area, and a third content area adjacent to the second content area;
    detecting a first touch input for selecting the first content area;
    assigning a first selection area to the first content area corresponding to the first touch input;
    detecting a second touch input for moving the first selection area and the second content area to a first direction;
    moving the first selection area and the second content area to the first direction corresponding to the second touch input, wherein the first selection area is scrolled over and a displayed size of the first selection area is shrunk according to the second touch input;
    fixing a position and a size of the first selection area when the first selection area is displayed with a size equal to a predetermined size by moving the first selection area, wherein the predetermined size is a minimum size with which the first selection area is displayed;
    detecting a third touch input for moving the content to the first direction, wherein the third touch input is detected on any portion of the second content area; and
    generating a folding area adjacent to the fixed first selection area, folding the entire second content area on which the third touch input is detected into the folding area, and displaying the third content area adjacent to the folding area having the entire second content area folded therein according to the third touch input,
    wherein the third touch input is detected sequentially to the second touch input, and a direction associated with the second touch input and the third touch input is the same.

* * * * *